United States Patent [19]

Dunnous

[11] Patent Number: 5,025,954
[45] Date of Patent: Jun. 25, 1991

[54] MULTI-COMPONENTS MEASURING AND DISPENSING SYSTEM

[75] Inventor: Jack Dunnous, Philadelphia, Pa.

[73] Assignee: Hamburger Color Company, King of Prussia, Pa.

[21] Appl. No.: 473,311

[22] Filed: Feb. 1, 1990

[51] Int. Cl.$^5$ .............................. B67D 5/08; B05B 3/00
[52] U.S. Cl. .................................. 222/56; 134/57 R; 134/166 R
[58] Field of Search ...................... 222/56, 64, 65, 132, 222/135; 134/166 R, 169 R, 57 R

[56] References Cited

U.S. PATENT DOCUMENTS

| | | | |
|---|---|---|---|
| 3,945,411 | 3/1976 | Skoli et al. | 134/169 R |
| 4,362,033 | 12/1982 | Young | 222/56 |
| 4,615,351 | 10/1986 | Schliefer et al. | 222/56 |
| 4,789,014 | 12/1988 | DiGianfilippo et al. | 222/56 |
| 4,905,325 | 3/1990 | Colditz | 134/166 R |

Primary Examiner—Andres Kashnikow
Assistant Examiner—Lesley D. Morris
Attorney, Agent, or Firm—Dann, Dorfman, Herrell & Skillman

[57] ABSTRACT

Components of a multi-component mixture are individually fed into a measuring container from the bottom through individual precision valves, the component being fluid rises in the container and its level is monitored by ultrasonic means which, in turn, input the measurement to a computer for comparison in memory to determine volume. When the measured level indicates a desired volume is achieved, the feed valve is closed. The contents are then drained from the bottom of the measuring container into a mixing container, and the next component measured in the same way until all components have been measured or the components are sequentially fed and measured until all of the components are present in the tube before discharge. The operation is under computer control which turns on and off the individual precision feed valves and opens a drain valve to drain the contents from the measuring container as well as determining when the proper volume or weight has been achieved.

10 Claims, 1 Drawing Sheet

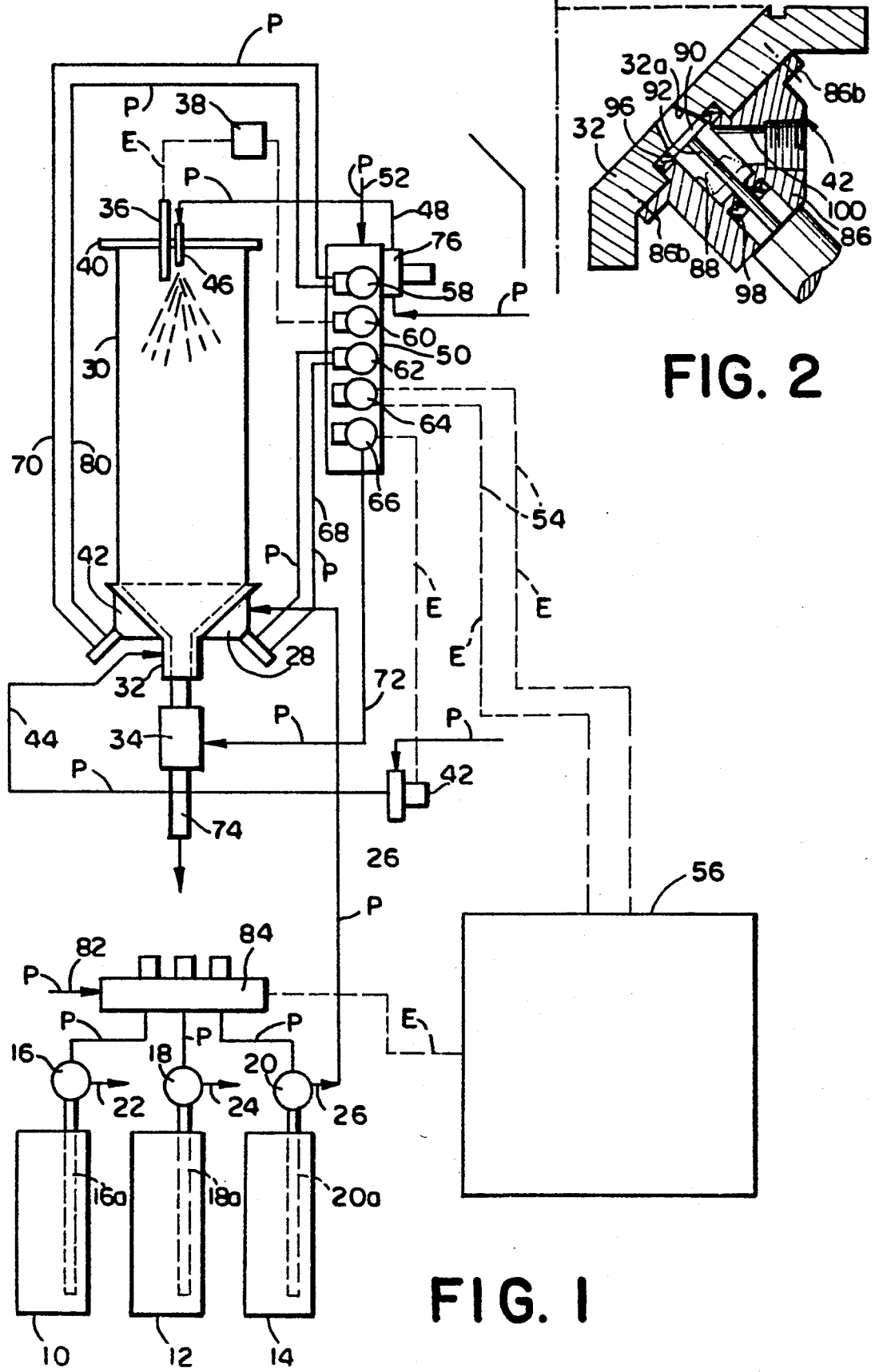

MULTI-COMPONENTS MEASURING AND DISPENSING SYSTEM

The present invention relates to a multi-components measuring and dispensing system which employs computer control and an electronic measuring system together with a precise volume container for measuring the volume of fluid constituents supplied through the bottom of the container. More specifically the present invention relates to a means for measuring by the level of a fluid in the container and thereby the volume of that material so that by sequential precision measurements repeatable multi-component mixtures are obtained.

BACKGROUND OF THE INVENTION

Multi-components measuring and dispensing systems are generally required where several chemical components in liquid form must be individually measured to satisfy a certain predetermined formula. The measurements must be precise and accurate to produce the results desired from the mixture when all of the components are eventually mixed together and to assure that the mixture is the same each time it is made.

An example of such applications are reactive liquid polymers and a catalyst for the production of polymerized solids where not only the amounts but the sequencing of the selected components may be critical. Another application would be the combination of basic colors to produce a certain desired shade of paints or pigments such as those used in coloring concrete In such an application each color component must be precisely measured before mixing to achieve accurate repeatable results.

Today there are equipments available on the market which are intended to achieve the desired results. Some of this equipment is quite good, but also may be complex and expensive to make A typical device uses an electronic weighing cell fitted with a receiving tank where the different components are sequentially introduced and weighed according to a predetermined formula residing in the memory of the controlling electronic circuitry.

The present invention deals with a simpler and more versatile system which achieves the results of prior art equipment at least as accurately but without certain disadvantages inherent in the use of load cells and the complication of the intended apparatus. One such disadvantage has to do with the delivery hose connections that become part of the spring feed back affecting cell calibration. The load cell may also employ a delicate mechanical linkage which is often affected by environmental conditions. Load cell scales, like other scales, are subject to continuing maintenance and relatively easily get out of calibration. Thus the precision of a device employing load cells is difficult to rely upon and requires too much attention.

THE NATURE OF THE PRESENT INVENTION

The present invention employs a measuring container fitted with ultrasonic transducer means to generate and pick up an ultrasonic wave directed toward the surface of liquid which enters from the bottom of the container. The ultrasonic detector picks up the reflected wave from the surface to measure the distances from the fixed position of the transducer means to a specific surface below. Since the measuring container is of fixed unvarying size, the measurement allows calculation of the volume of the fluid in the measuring container. The constituents introduced are selected by the computer. As the transducer-repeatedly performs its measurement, the computer calculates volume by an algorithm translating the surface level into volume. The computer also compares the changing volume readings with a desired volume of the particular component being measured. When the desired volume has been achieved, the feed valve for that particular component is shut off. The feed valves are in the bottom of the measuring container so that they are positioned to fill the components from within the measured volume, rather than along the walls of the container. The selected component may actually need to be chosen on the basis of the weight of that component, but, even though volume is measured, since the weight per unit height of the tube (specific weight) of each component is stored in the computer memory, the proper amount of component by weight is selected. In programming the computer input of specific weight of each component allows the computer to calculate the equivalent volume for any desired weight. Alternatively input may simply be desired volume. The so-called "dribble valves" preferably employed in the bottom of the container are capable of rapid complete shut off at any level selected by the computer. Valves are connected by pumps and hoses to supplies of the liquid components. The computer program will select the sequencing of the valves for a particular mix and compute the amounts of the materials needed to provide the precise mixture of constituents desired. The computer will also actuate the pump to provide each desired component from its supply in turn. After measurement, each component is emptied into a mixing container in sequence. Alternatively two or more components may be measured together before opening the drain valve in the bottom of the measuring container.

More specifically the present invention consists of a multi-component measuring and dispensing system which employs a measuring container of precision configuration such that it may be precisely calibrated for volume at various discrete levels of fluid. Ultrasonic source and detector measure are provided at a precise location in the top of the container for measuring the level of fluid in the container in terms of the distance of the fluid surface from the ultrasonic means. A plurality of precision valves adjacent the bottom of the container provide access of selected fluids to the measuring container. Delivery means connected to the valves connect each valve to a source of desired fluid. Valve control means are responsive to signals to open and close each valve. Computer means controls selection of a fluid through selection of a valve connected to that fluid supply and opens that valve and allows fluid to flow into the measuring container until the ultrasonic sensors indicate a predetermined volume of the selected fluid is achieved, at which time the computer means causes the valve control means to close the valve precisely. Means responsive to the computer control for draining fluid from the container into a mixer.

DRAWINGS OF THE PRESENT INVENTION

FIG. 1 schematically shows apparatus in accordance with the present invention; and FIG. 2 is a somewhat schematic representation in section of a dribble valve which may be used in the apparatus of FIG. 1.

SPECIFIC DESCRIPTION OF A PREFERRED EMBODIMENT OF THE INVENTION

The present invention for simplicity will be considered in terms of that application in which fluid pigments are combined to make a particular color for use in coloring concrete, for example. The invention permits almost an unlimited number of component fluids to be used and in some applications a large number may be used, but in this particular application rarely more than six or eight pigments are used. A system dedicated to such use can be accordingly limited in the number of valves and related equipment employed for each component.

The drawing for simplicity in illustration shows supply drums 10, 12 and 14 for only three such color constituents, it being understood that an additional drum and feed system is used for each color added. Pumps 16, 18 and 20 have pipe extensions 16a, 18a and 20a extending to the bottoms of the drums 10, 12 and 14, respectively, whereby the constituent pigment fluids of each barrel can be pumped even from a remote storage area through tubing schematically shown as lines 22, 24 and 26 to the bottom of the measuring container. Each line is connected to a precision valve such as dribble valve 28 which is connected to line 26 in the bottom of a precision fixed volume measuring container 30. Container 30 has a precise volume and terminates in a funnel-shaped bottom 32 or other means to direct the contents of the chamber to drain valve 34.

Valve 34 is designed so that when closed it provides a precise bottom level to the container 30. As a consequence the container 30 could be calibrated if desired with calibration marks at different levels to show different specific volumes. In this case, however, even greater precision can be obtained by precalibrating the height of the liquid for different volumes and then effectively measuring the height of the liquid in the container to precisely determine its volume. This is preferably done by an ultrasonic transducer 36 which may be a composite ultrasound wave source and detector means, or separate transmitters and receivers may be employed. An ultrasound generator 38 may be employed to produce a pulse of ultrasonic vibrations at a desired frequency or frequencies. In this case the transducer shown fixed to a removable top 40, which, however, has precision positioning capability to the container 30 so that it will always be in precisely the same position and the ultrasound generator and detector will be held at precisely the same level at all times.

It will be understood that multiple valves similar to valve 28 are used for other components and in addition a completely separate valve 42 may be used as a water supply valve connected to a water line 44 instead of the color supply tube 26, or the equivalent tubes 22 and 24 for other color pigments. Water may be supplied from the bottom to dilute the pigments and add to their volume in accordance with some predetermined formulation. Water is supplied from the top of the container by nozzle 46 connected to water line 48 to wash the container from the top using a spray head. When washing occurs the drain valve 34 may be left open. This is controlled by the computer program to occur at some time when the container is empty following a formulation or a single measurement. Wash water may be disposed of by a diverter valve (not shown) below the drain valve 34 or fed into the mixing vessel as part of the total formulation. In those instances when water is measured as a constituent or component, it must be controlled in the same way that other valves are controlled.

In this regard, valve 42 may preferably be a standard valve such as those made by Automatic Switch Company and sold under Catalog No. 8262. FIG. 2 shows a sectional view through a valve such as valve 28 which is provided with a metallic block body 86 and flanges 86a and 86b which enable the block to be bolted to the frustoconical surface of cone member 32 of the funnel portion of the measuring container. The valve consists of a poppet 90 driven by the shaft 92 from air cylinder 94. The poppet operates in a cylinder 88 in the block 86 from the closed position shown in full lines to the dashed line open position of the valve. When the valve is closed the cylindrical edges of the poppet engage sealing means 96 to shut off flow. Preferably an opening 32a in the funnel conforms to the shape of the poppet and the poppet is made to be flush with the inside of the funnel when the valve is closed. Packing is also provided between the cylinder 88 and the inner cylinder shaft 92 which minimizes flow back. The valve is fed through a diagonal channel 100 from a supply line (not shown). The valve of this sort can have very short opening and closing times of on the order of 50 ms. This leads to great precision and control of the flow through the valve which need not be operated at quite that rate. A time increment of 100 to 200 ms may allow the liquid from the valve to cause the liquid in the measuring chamber to rise 0.010 inch. Thus by small increment adjustments great precision in a volume can be measured.

Valves such as 28 employ air as an actuating means and their control means are concentrated in a junction box 50. Each control means regulates the output of air from line 52 to the respective valves. The valves are controlled by control valves 58, 60, 62, 64 and 66, each of which has two output pneumatic lines, some of which are not illustrated. Electrical lines 54 from computer means 56 provide actuating and cut off signals to the control means. Valve 62 has lines 68 and 70 which respectively open and close the valve to allow the component fed through line 26 to pass through the valve 28 into measuring container compartment 30. When the desired level within the container 30 (i.e., desired volume of the component) is sensed, i.e., the ultrasonic sensor sends a signal to the computer means which matches the desired volume, the computer means signals control 62 to close valve 28 instantaneously. The signal sent back is actually in terms of the time between the transmission of a pulse to the surface and reflection back to the transducer. Very small differences are detected and this permits very fine volume calibration to be achieved, so that very small increments of volume change can be selected. The valve is shut off precisely when the desired volume is achieved. Then a signal is sent to the drain valve 34 through line 72 which allows discharge of the contents of the measuring container through the drain valve and tube 74 into an appropriate mixer. In some situations it may be desirable to wash the container 30 after each constituent, in which case the computer means can provide signals to actuate spray head 46 through its valve 76. It is possible to provide a diverter valve in line 74 so that the wash water will not be introduced into the mixture, and the diverter valve can again be controlled by the computer means.

In this particular embodiment the pumps 16, 18 and 20 are pneumatically driven pumps using an air supply 82 through a controller 84 to select a particular pump when its constituent is demanded or about to be demanded.

The computerization of the system allows control of many components, for example up to 8 different components in a practical system. The number of components in a particular composite, however, is limited by the number of valves available to introduce the respective components into the measuring container, but the measuring container need not be limited as to size and different sizes of containers with different numbers of supply valves can be provided in varying situations.

The computer control system is easily adjusted by a service person. Changes in the selected formulation can be made very easily. Changes such as the amounts of constituents or components in a particular formulation may also be made relatively easily as needed. The control panel of the computer can be located in any convenient area which, however, is usually advantageously installed in the control room. The system is simple and straightforward, the electrical parts using plug-in harness cables and the fluid parts using flexible tubing for the most part, with valves which are simple in construction and require only long term maintenance. The computer can also provide a display which shows the progress of processing a particular formulation. For example, in a color component situation the data on display shows the progress of the color feeding cycle. The display also shows information being fed into memory in the program mode so that the operator can check the accuracy of the input as it occurs.

It is possible to provide alarm interlocks which insure that a cycle will not proceed unless each color has been fully charged or each constituent is present in sufficient quantity. In use the measuring container receives and measures, for example, individual color components in sequence and in the proper amount in accordance with the selected program. At a discharge signal the drain valve 34 in the bottom of the measuring container is opened allowing the contents to flow into a mixer. After removal of the mixture, the water nozzle 46 may then be activated to wash the walls of the measuring container and the drain valve and hose. If this is done at least after each mixture is complete, maintaining the equipment poses few problems. The individual color components of the system remain in the pump and delivery hose, but the end of the hose is sealed by a dribble valve. When one component is substituted for another, the supply pump, piping hose and dribble valve will be washed with water through the open dribble valve.

In the mixing of colors for concrete embodiment normally three to five basic colors are enough to produce all shades generally used in coloring concrete mixes. However, a typical system would be designed to accept up to eight constituents of special colors such as green, white and others.

A typical measuring container 30 might be 60 inches high, ten inches in width and 15 inches deep, which dimension would include the associated valving system. The drain valve is normally located over a mixing container (not shown) so that it can empty itself by gravity. In the washing of the measuring container the valve in the discharge tube in the case of concrete color mixing is easily handled by plain water. Other applications may, of course, require other solvents for cleaning. Formulations are, of course, placed in the memory of the computer in a program sequence, which may vary with different computers, but whatever computer is used it is relatively simply programmed. Then, when needed for use the program can be recalled by simple digital or alphanumeric code for each formulation provided in memory.

It will be clear to those skilled in the art that many variations of the present invention are possible. All variations within the scope and spirit of the appended claims are intended to be within the scope of the present invention.

I claim:

1. A multi-component fluid measuring, mixing and dispensing system in which the components added all increase the volume of the mixture by the volume of the fluid component added comprising:
   a measuring container of fixed configuration such that it may be precisely calibrated for volume at various discrete levels of fluid;
   ultrasonic wave source and detector means, each having a precise location in the top of the container for measuring the level of fluid in the container in terms of the distances of the fluid surface from the ultrasonic means;
   a plurality of precision valves located at the container wall at the bottom of the measuring container providing access to selected fluid components to be measured and such that the fluid components when physically mixed maintain a constant volume;
   conduit means connected to the valves for connecting each valve to a source of that valve's selected fluid component;
   valve control means for each valve responsive to valve opeon and valve close signals;
   computer means controlling selection of each fluid component through selection of a valve connected to a known component fluid supply to open the valve and allow the selected fluid component to flow into the chamber until the computer means determines from ultrasonic detector means that collection of a predetermined volume of the selected fluid component is occurring, at which time the computer means causes the valve control means to close the valve precisely;
   repetition of the valve selection process until all fluid components required for a particular mix have been added and precisely measured; and
   means for draining fluid from the container into a mixer.

2. The multi-component measuring and dispensing system of claim 1 in which pump means is provided for each of the fluid component supplies, including means to draw the fluid from the component supply to a specific one of the precision valve means.

3. The multi-component measuring and dispensing system of claim 2 in which the pump means are controlled by the computer control to come on in time to feed the selected component through the open precision valve to the measuring container.

4. The multi-component measuring and dispensing system of claim 1 in which the bottom of the container is funnel shaped and the means for draining fluid from the container into the mixer is a drain valve under control of the computer means.

5. The multi-component measuring and dispensing system of claim 1 in which the bottom of the measuring container is shaped to funnel down to the means for draining the fluid from the container which is a normally closed drain valve and the precision valves are arranged at least partially in the funnel region.

6. The multi-component measuring and dispensing system of claim 1 in which the precision valves are pneumatically control valves, in turn, controlled by pneumatic controls through the computer means.

7. The multi-component measuring and dispensing system of claim 1 in which a spray head is positioned at the top of the measuring container to wash the measuring container out after use.

8. The multi-component measuring and dispensing system of claim 7 in which the spray head operation is controlled by the computer control for proper synchronizing with the operation of the precision valves and the means for draining fluid from the container which is also computer controlled.

9. The multi-component measuring and dispensing system of claim 1 in which the ultrasonic wave source and the detector means are a common unit fixed together at the top of the measuring container and whose output signals are continually fed to the computer means for comparison with the values that correspond to predetermined volumes of a fluid in the measuring container.

10. The multi-component measuring and dispensing system of claim 4 in which the ultrasonic wave source and detector means produce output signals in rapid sequence to the computer means to permit comparison in a computer memory with values representing predetermined volumes and the computer in sequence actuates and closes the precision valve feeding the component and opens the drain valve to permit the contents to drain from the container.

* * * * *